O. W. SCHAUM.
CLUTCH.
APPLICATION FILED MAR. 20, 1916.
1,288,693.
Patented Dec. 24, 1918.
3 SHEETS—SHEET 1.
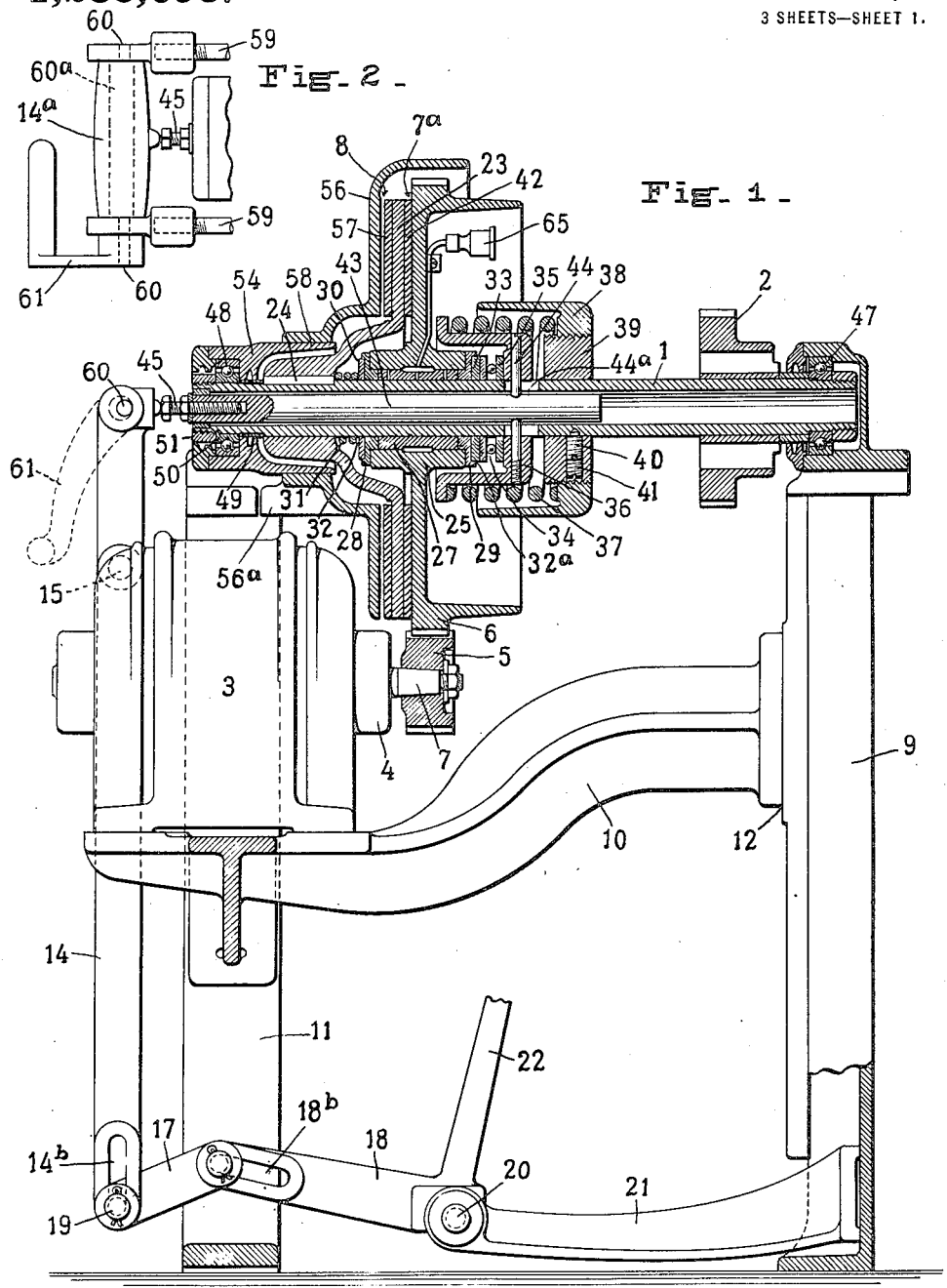

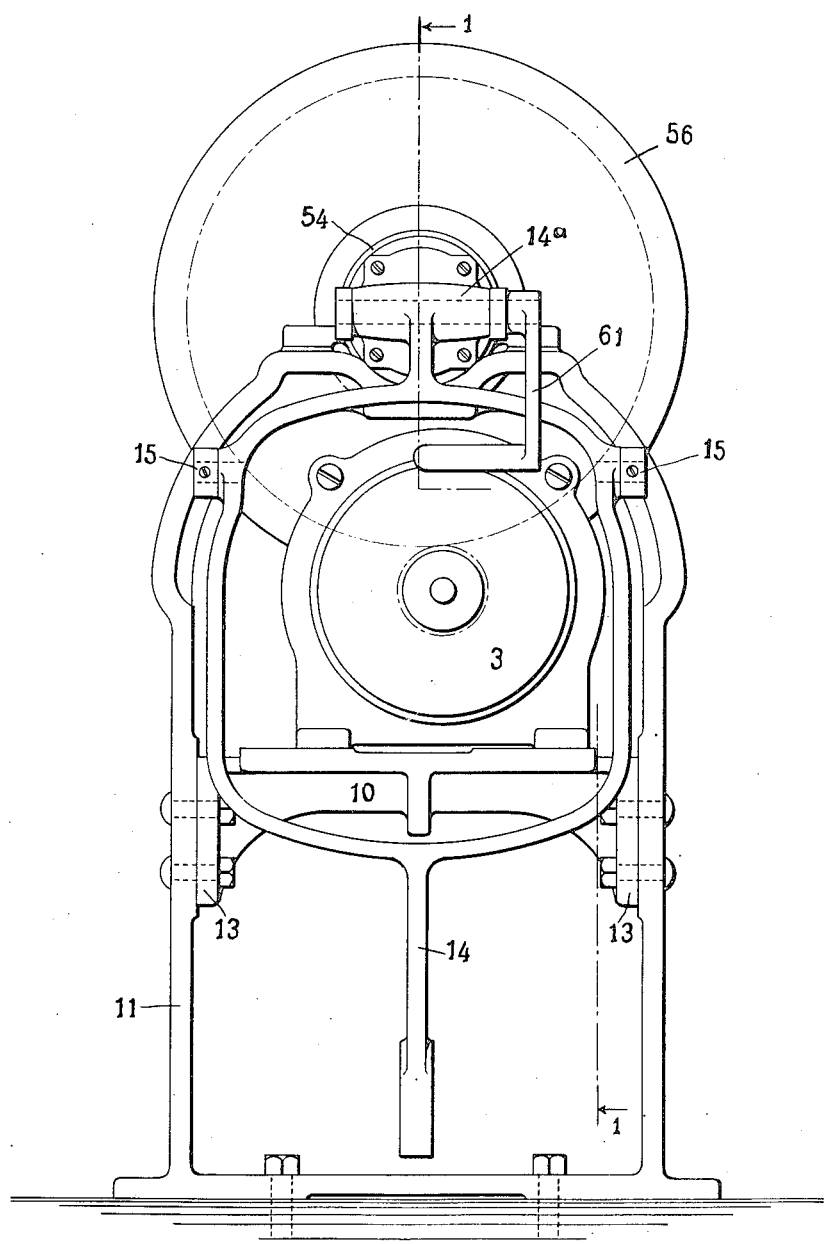

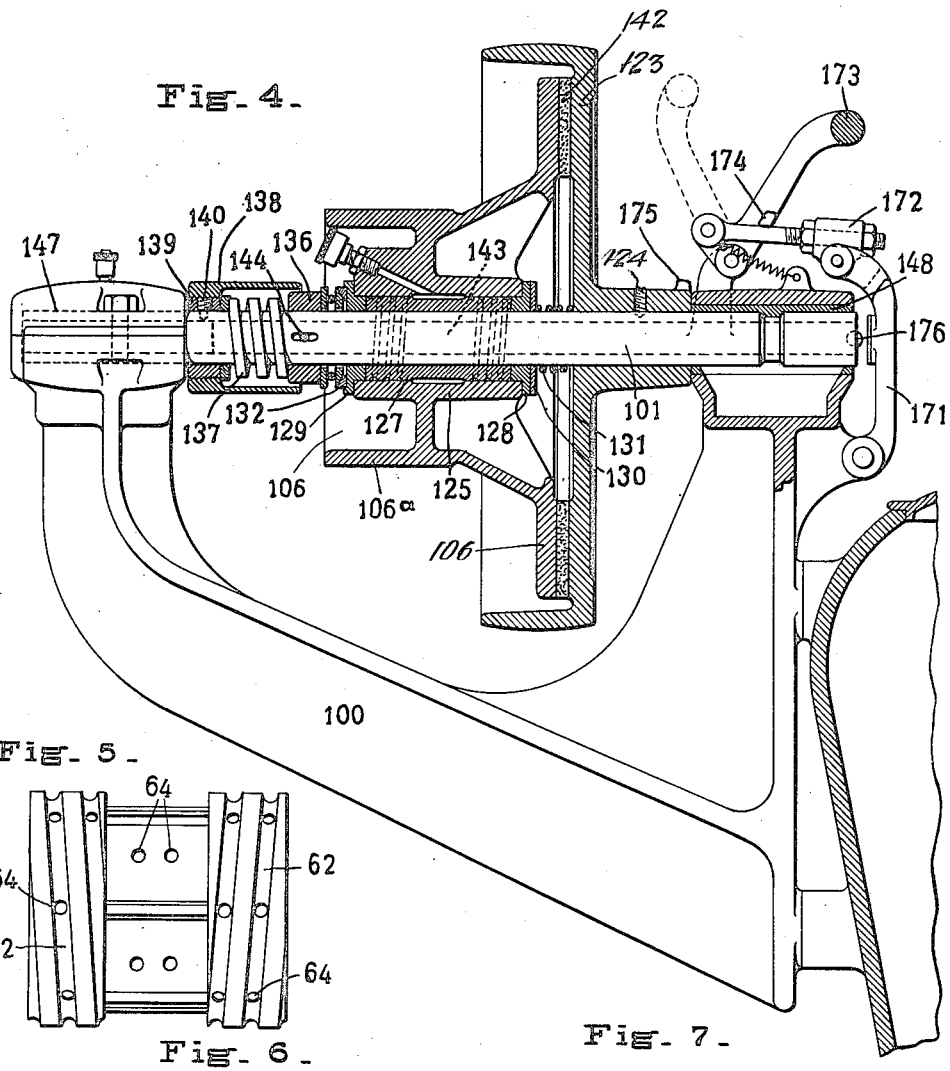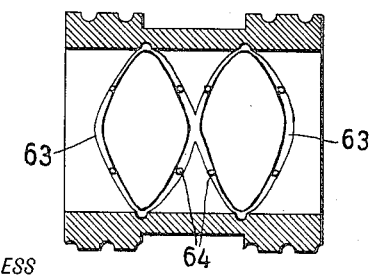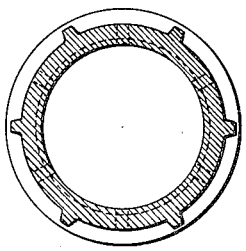

UNITED STATES PATENT OFFICE.

OTTO W. SCHAUM, OF PHILADELPHIA, PENNSYLVANIA, ASSIGNOR TO FLETCHER WORKS, INCORPORATED, A CORPORATION OF PENNSYLVANIA.

CLUTCH.

1,288,693.   Specification of Letters Patent.   Patented Dec. 24, 1918.

Application filed March 20, 1916.  Serial No. 85,275.

*To all whom it may concern:*

Be it known that I, OTTO W. SCHAUM, a citizen of the United States, and a resident of Philadelphia, county of Philadelphia, State of Pennsylvania, have invented new and useful Improvements in Clutches, of which the following is a specification.

The invention relates to friction clutches and one object of the invention is to construct a friction clutch in which the clutch structure is a self-contained unit revolving on a main spindle or main shaft with practically no end-thrust.

According to one phase of my invention there is also employed a brake member which can be brought into operation simultaneously with the opening of a clutch whereby the movement of a main shaft which is driven by the clutch will be quickly arrested. This is preferably accomplished by making the driven member of the clutch in the form of a disk having two faces one of which is engaged by the driving member of the clutch and the other of which is engaged by a brake member which can be forced into engagement with the disk when the driving member of the clutch is out of engagement with the disk.

As showing certain specific embodiments of the invention reference is made to the drawings forming a part of this specification and in which drawings, Figure 1 illustrates a combined clutch and brake mechanism which embodies the invention. This figure is a partial sectional view taken as on the line 1—1 of Fig. 3 and the combined clutch and brake is illustrated as applied to the end of a loom.

Fig. 2 is a plan view of a part of the brake mechanism which is shown more fully in Figs. 1 and 3. The mechanism illustrated in this figure may be referred to as the brake releasing mechanism since its function is to release the brake when desired.

Fig. 3 is an end view of the clutch and brake mechanism shown in Fig. 1.

Fig. 4 is a vertical sectional view illustrating a simple form of clutch construction in which the clutch elements revolve as a self-contained unit on the main shaft that is driven by the clutch.

Fig. 5 is a side view of a bushing used in the clutch shown in Figs. 1 and 2.

Figs. 6 and 7 are, respectively, longitudinal and transverse sectional views of the bushing shown in Fig. 5.

Referring to the form of invention as embodied in the construction shown in Figs. 1, 2 and 3, 1 designates a main shaft or spindle from which power is supplied as through a gear 2 for operating the machine. A continuous running motor is designated by 3. This motor has the usual rotatable element 4 upon a shaft 7 on which a motor pinion 5 is located. 6 is a continuously rotating clutch member having teeth thereupon which mesh with the teeth of the motor pinion. This clutch member 6 and in fact the rotatable members of the motor as well as the pinion 5 constitute continuously moving inertia elements through which the main shaft 1 is driven when the clutch is closed at 7$^a$. When the clutch is open an annular brake member that surrounds or encircles the main shaft 1 comes into operation as at 8 to arrest the movement of the main shaft 1. At this time the clutch member 6 is free to rotate about the shaft 1. The frame or housing which supports the main shaft, the motor and the combined clutch and brake mechanism between the shaft and motor comprises as a part thereof a member 9 (which is in fact a portion of the end housing of a loom) a motor bracket 10 and an arch-shaped standard 11. The motor bracket or platform is connected at 12 to the member 9 and at 13, 13 to the arch-shaped standard 11.

The mechanism for throwing the clutch in and out may be referred to as clutch closing and releasing mechanism, or it may be referred to as a clutch controlling mechanism, and it comprises a transverse member 14$^a$ constituting a screw engaging member. This member is clearly shown in Fig. 2 and the screw which it engages is designated by the reference character 45 in Fig. 1 and will be subsequently more fully described. The transverse member 14$^a$ constitutes the upper end of the lever 14 which is pivoted at 15 to the arch-shaped standard 11. A toggle link construction formed by links 17 and 18 provides a means through which the lower end of the lever 14 is moved. One end of the link 17 is secured at 19 to the lower end of the lever 14 and one end of link 18 is pivotally mounted at 20 on the end of a bracket 21 which is secured to the housing member 9. The toggle is caused to operate in any suitable manner either automatically or by hand as through the medium of a lever 22 which is secured to the toggle link member 18. When the toggle is open, that is when the links occupy the broken position as shown in Fig. 1, the clutch is on or closed and the brake is off. When the toggle is straightened or closed the lever 14 presses against the screw 45 in a manner to open the clutch and if the handle designated by 61 remains in the position shown by the dotted lines in Fig. 1 the brake will be in closed position at 8. The brake member, however, can be released by moving the handle 61 in the manner which will be hereinafter described, if it is desired to do this in order to turn over the machine, as by hand, or for any other purpose. The clutch which closes at 7$^a$ comprises the continuously moving inertia element or gear member 6 and the intermediate member or double disk member 23 which is secured to the main shaft 1 by key 24 whereby the disk 23 and the main shaft will always rotate together. The inertia element or gear member 6 may be referred to as the driving member of the clutch and the double disk 23 may be referred to as the driven member of the clutch, as the member 6 drives the member 23 when the two are in operative engagement with each other. It will thus be apparent that the member 23 serves to drive the main shaft when the clutch is closed. The continuously rotating member 6 has a hub 25 which is provided with a bushing 27 and end-collars 28 and 29. The bushing is shown in detail in Figs. 5, 6 and 7. In collar 28 there is a washer 30 that serves as a seat 32 for one end of a compression spring 31; the other end of this spring is seated on the disk member 23. This spring may be referred to as an auxiliary or secondary spring because its function is merely to effect an opening of the clutch members when allowed to do so. In other words, unless prevented this spring will force the member 6 from the position where it engages the disk member 23. The auxiliary spring member 31 is also sometimes referred to as a clutch releasing means since its function is to release or open the clutch and it may be referred to as a secondary means that opens the clutch since it is secondary to the main compression spring 37 that is hereinafter more fully described and which main compression spring 37 may be properly referred to as a primary means that closes the clutch and maintains it closed. The end-collar 29 has a seat 32$^a$ which receives a bearing ring 33 of the ball-bearing 34; the other ring 35 of the ball-bearing engages the cup-shaped member 36 which member at times is moved by a spring 37 that engages it. This cup-shaped member is operated at other times so as to compress the spring 37 to render the function of the latter inoperative. One end of the spring 37 presses against a flanged portion of the cup-shaped member 36 and the other end of the spring 37 presses against a cup-shaped member 38 that is mounted upon an annular ring 39 which is secured directly to the shaft 1 as by means of a screw 40 and a locking screw 41. The cup-shaped member 38 and the annular ring 39 constitute what may be referred to as a resisting member secured to the shaft 1 since the function of the member 38 and ring 39 is to operate as a member on the shaft to resist the thrust of the spring 37. The cup-shaped member 36 may be referred to as an intermediate member since it is located between the continuously rotating clutch member 6 and the resisting member that is carried by the shaft. The spring 37 is a comparatively large compression spring that is located between the intermediate member and the resisting member and this spring may be referred to as the main spring of the clutch. The function of this spring is to force the continuously rotating clutch member 6 into operative engagement with the disk member 23, except at such times when it is prevented from doing so by mechanism which will be hereinafter described. The main spring presses the member 6 into operative engagement with the disk member 23 by forcing the intermediate member 36 against the ball bearing 34 at the end of the hub of the member 6. When the main spring is allowed to exert its pressure against the hub of the continuously rotating member 6 it overcomes the pressure of the auxiliary spring 31 and the member 6 is forcibly pressed against the leather or other wearing material 42 on the face of the disk 23, thus closing the clutch at 7$^a$.

From an inspection of the drawings it will be observed that when in operation all of the thrust of the main spring 37, which is the sole member that exerts any force to hold the clutch members in closed position, is ultimately resisted by the disk 23 on the one hand and the resisting ring or member on the other, both of which are secured to and carried by the main shaft, thus making the clutch a self-contained structure and one in which there is no endwise thrust on the main shaft that results from the holding of the clutch members in closed position.

In order to restrict or compress the main spring 37 so as to render the clutch inoperative whereby the auxiliary spring 31 will open the clutch there is provided a spindle 43 which is secured at its inner end to the cup-shaped intermediate member 36 by means of a screw or pin 44 that passes through slots 44$^a$ in shaft 1. At the other end of the spindle 43 there is provided the screw 45 heretofore referred to, this being the screw that is engaged by the transversely extending member 14ª clearly shown in Fig. 2. This screw serves also as an adjusting means to lengthen or shorten the effective length of the spindle 43. When the toggle link construction comprising the links 17 and 18 is closed the lower end of the lever 14 is forced outwardly and the transverse member 14ª is forced inwardly toward the clutch mechanism whereby the member 14ª will press against the screw 45 so as to move the spindle 43 to the right, thus forcing the intermediate cup-shaped member 36 to the right, away from the continuously rotating clutch member 6, against the pressure of the main spring 37. This allows the auxiliary spring 31 to perform its function so as to open the clutch. The clutch member 6 is now free to revolve on the main shaft, even though the disk and members driven thereby remain stationary. The thrust resulting from the auxiliary spring 31 pressing against the hub 25 that is against the washer secured in the collar 28 at the end of the hub is absorbed by the ball bearing 34. One end of the main shaft 1 is carried in a ball-bearing 47 which is in the housing member 9 and the other end of the shaft is carried in a ball-bearing 48 which is in the member 54 that is on or constitutes a part of the arch-shaped standard 11. The inner bearing ring 50 of the ball-bearing 48 is clamped in place between a spacing washer 49 and a nut 51. The brake construction which is closed at 8 comprises a movable cover or brake member 56 which can be positioned so as to engage the leather or wearing members 57 on the disk 23. The movable cover is slidably mounted on a cylindrical sleeve or extension 58 that is on the member 54 of the standard 11. This cover or brake member can be moved longitudinally along the sleeve—or along the main shaft—but is held against rotation by any suitable lugs as 56ª which engage a portion of the arch-shaped standard 11. One of the ball-bearings of the main shaft, for instance the ball-bearing 48 is shown as constructed so as to perform the function of a thrust bearing when the brake member or cover 56 is forced against the disk 23 for the purpose of acting as a brake. When operating to absorb the thrust it will be observed that the main shaft is rotating in the bearing only a short period of time since the brake member very quickly arrests the rotary movement of the engaged shaft. The movement of the brake member 56 toward braking position is accomplished through the medium of the rod members 59 which are connected at one end to the cover or brake member 56 and at the other end to eccentrics 60 which are carried on the ends of a shaft 60ª that pass through the transverse member 14ª at the upper end of the lever 14. The shaft 60ª carries thereupon a handle 61 and the eccentrics are arranged upon the shaft in such a manner that when the handle is in normal position, which is the position shown in dotted lines in Fig. 1, the cover will be moved to braking position by the closing of the toggle. The length of the rods 59 is such, however, that when the toggle is open as shown in Fig. 1 the cover will be away from the disk 23. There are times, however, when the toggle is closed and the clutch is open at 7ª that it is desired to rotate the main shaft 1 and disk carried thereby without closing the clutch at 7ª. This can be accomplished by merely raising the free end of the handle 61 whereby the eccentrics will draw the brake member away from the disk. The lever 14 has been provided with a slotted portion at 14ᵇ and the link 18 has been provided with a slotted portion at 18ᵇ. The purpose of these slotted portions at the places indicated is to provide a means for adjusting the effective length of the lever and also the length of the toggle so as to regulate, as desired, the throw of the upper end of the lever. The bushing 27 that is within the hub 25 of the continuously rotating clutch member 6 is clearly shown in Figs. 5, 6 and 7. This bushing has spiral grooves 62 at each end of the exterior portion thereof and there are also two 8-shaped grooves 63 within the interior portion of the bushing, the function of these grooves is to provide means for continuously supplying oil between the main shaft 1 and bushing on the one hand and between the exterior of the bushing and the hub of the rotating clutch 6 on the other. Holes 64 are also provided in this bushing whereby oil can flow from the grooves on the interior to the grooves on the exterior of the bushing and vice versa. Means for supplying oil to the receiving space between the hub and this bushing is designated at 65.

In Fig. 4 another form of simple clutch is illustrated which embodies one phase of my invention. In said figure the housing for supporting the clutch takes the form of a bracket and may be attached to any portion of a machine as desired. This bracket or housing is designated by the reference character 100. A main shaft 101 is supported in suitable bearings 147 and 148 and it will be observed that the bearing at 148 is constructed so that it can serve to a certain extent as a thrust bearing. A continuously rotating clutch driving member 106 is supported on the main shaft 101 and is arranged to engage the disk or driven member 123 of the clutch. The driven member 123 is secured to the main shaft 101 as by means of a set-screw 124. The continuously rotating clutch member 106 is driven in any suitable manner as by means of a belt which passes over a pulley 106ª. The hub 125 of the continuously rotating member 106 is provided with a bushing 127 and end-collars 128 and 129. An auxiliary spring 131 is provided between the disk or driven member 123 and the end-collar 128 and one end of this spring rests against a washer 130. The main shaft 1 carries a main spring resisting member which comprises an annular ring 139 and cup-shaped member 138, the annular ring 139 being the part secured to the main shaft as through the medium of the set-screw 140. Between the resisting member and the hub 125 there is located an intermediate member or ring 136. This member 136 presses against one of the bearing rings of a roller thrust bearing the other ring of which bearing presses against a seat 132 on the end-collar 129. A main compression spring is designated by 137 and one end of this compression spring continuously presses against the intermediate member 136 and the other end of the spring exerts its force against the resisting member which is carried on the shaft. The main shaft is hollow and has therein a spindle 143 that is connected through the medium of the screw or pin 144 to the intermediate member 136. Through the medium of this spindle 143 the intermediate member can be forced so as to press the main spring 137 whereby the auxiliary spring 131 will be allowed to operate so as to open the clutch. When, however, the spindle 143 is not moved so as to cause the resisting member to compress the spring 137 the latter will exert pressure against the intermediate member sufficient to force the continuously rotating member of the clutch 106 into operative engagement with the leather 142 that is on the disk or driven member of the clutch. The spindle 143 can be moved by means of the clutch opening and closing mechanism comprising the pivot link 171, adjusting link 172 and operating handle 173. This handle is made so that a stop 174 will engage the link 172 when the handle occupies the full line position. When the handle occupies the position indicated by dotted lines it will engage a stop 175.

It will be manifest from an inspection of the drawings that when the handle occupies the full line position the various parts will tend to remain in said position. When the handle occupies the position indicated by dotted lines it will retain the parts in the position to which they have been moved by the handle whereby the link 171 will be in engagement with the hardened steel ball 176 that is on the spindle 143 thereby forcing the latter to the left and thus holding the main spring 137 compressed by means of the intermediate member 136, thus allowing the clutch to be opened by means of the auxiliary spring 131. It will therefore be seen that the construction and operation of the clutch shown in Fig. 4 is substantially the same as the clutch described in connection with Figs. 1 and 2 and therefore further description is unnecessary.

The ball-bearing 34 of Fig. 1 which is in effect a thrust bearing and which is located between the driving member of the clutch and the intermediate member of the clutch—and the same is true of a corresponding bearing similarly located as shown in Fig. 4—can be and is relied upon to perform two functions. Under certain conditions and at certain times it allows the driving member—this is at a time when the clutch is open—to freely rotate relative to the intermediate member, and under other conditions or at other times it transmits pressure from the intermediate member to the driving member whereby the intermediate member is enabled to press the driving member into operative or driving engagement with the driven member of the clutch—this is the condition existing when the clutch is closed.

The mechanism for controlling the relative position of the clutch members and which mechanism includes such parts as the lever 14, screw 45 and spindle 43 (see Fig. 1) may be referred to as a part of the clutch controlling means while the mechanism that includes the shaft 60ª—which is in fact a hand-positioning eccentric shaft—and the rods 59 (see Fig. 2) may be referred to as a second means between the clutch controlling means and the brake member 56 whereby when the shaft 60ª is in a normal position the brake will be applied as the clutch is opened. The eccentric shaft 60ª which is positioned by the handle 61 can be moved from its normal position to an abnormal position relative to the other parts of the clutch controlling means or relative to the other parts of the second means whereby the brake is functionally inoperative even though the clutch is open.

The improvements herein set forth are not limited to the precise construction and arrangement shown and described for they may be embodied in various forms and modifications without departing from the spirit and scope of the invention.

What I claim is:

1. A clutch comprising in combination a hollow main shaft, a clutch disk or driven member secured thereto, a driving member or gear rotatably mounted upon said shaft, an auxiliary spring means tending to normally force said driving member away from driving engagement with said clutch disk or driven member, a resisting member carried by said shaft, an intermediate pressing ring or member located between said driving member and said resisting member, a main compression spring engaging said intermediate pressing ring and also said resisting member, and a spindle located in said main shaft and connected to said intermediate ring so that the intermediate ring can be forced toward the resisting member thereby permitting the driving member to be moved by the auxiliary spring away from the clutch disk or driven member.

2. A clutch having a continuously rotating member, a main shaft, a disk or driven member of a clutch secured to said main shaft, which disk or driven member is driven by the continuously rotating member when the two are forced together with sufficient pressure, means comprising an auxiliary spring for normally tending to force the driving member from driving engagement with the driven member, a resisting member, an intermediate member located between the resisting member and the continuously rotating member, a thrust bearing between said continuously rotating member and said intermediate member, a main compression spring located between said intermediate member and said resisting member, and a spindle located within the main shaft and connected to said intermediate member so that the intermediate member can be forced toward said resisting member thereby permitting the auxiliary spring to move the driving and driven members relatively away from each other thereby opening the clutch.

3. In combination with the housing of a machine of a hollow main shaft rotatably mounted in said housing, a disk constituting the driven member of a friction clutch which disk is secured to said shaft so that the two will rotate together, a continuously rotating member revolubly mounted upon said shaft and constituting the driving member of a friction clutch of which said disk constitutes the driven member, means between said disk and said driving member normally tending to separate said members, a resisting member carried by said shaft and secured thereto, an intermediate member located between said continuously rotating member and said resisting member, and spring means engaging said resisting member and said intermediate member so as to force the intermediate member toward the continuously rotating member with sufficient pressure to maintain the driving member in frictional engagement with the driven member when allowed to do so, and a spindle carried within the shaft and secured to the intermediate member by means of which said intermediate member can be forced toward the resisting member, thus allowing the driving and driven members of the clutch to move relatively to each other so as to open or release the clutch.

This specification signed and witnessed this 17th day of March, A. D., 1916.

OTTO W. SCHAUM.

Signed in the presence of—
 CLARENCE A. GOSLIN,
 WM. H. HICKS.